United States Patent [19]
Wagner

[11] 3,780,882
[45] Dec. 25, 1973

[54] PLATE TURN-OVER MECHANISM

[75] Inventor: Ruprecht Wagner, Scheidt/Saar, Germany

[73] Assignee: Moeller & Nuemann GmbH, Ingbert/Saar, Germany

[22] Filed: Dec. 14, 1972

[21] Appl. No.: 315,182

[30] Foreign Application Priority Data
Dec. 16, 1971  Germany................... P 21 62 384.7

[52] U.S. Cl............................ 214/1 QA, 198/33 AD
[51] Int. Cl............................................. B65g 7/00
[58] Field of Search.............. 214/1 Q, 1 QA, 1 QG, 214/1 R, 130 R; 198/33 R, 33 AD

[56] References Cited
UNITED STATES PATENTS
2,365,007  12/1944  Rideout..................... 198/33 AD X
2,527,024  10/1950  Mitchell...................... 214/1 QA X FOREIGN PATENTS OR APPLICATIONS
1,158,026  11/1963  Germany......................... 214/1 QA Primary Examiner—Frank E. Werner
Attorney—John J. Dennemeyer

[57] ABSTRACT

A hydraulically driven plate turn-over mechanism enabling inspection of both sides of rolled plates. The mechanism has two groups of turning arms which are independently pivotal by hydraulic actuators. The actuators are pivotally secured to a rocker which is pivotal about a hydraulic axis by means of a further actuator.

3 Claims, 8 Drawing Figures

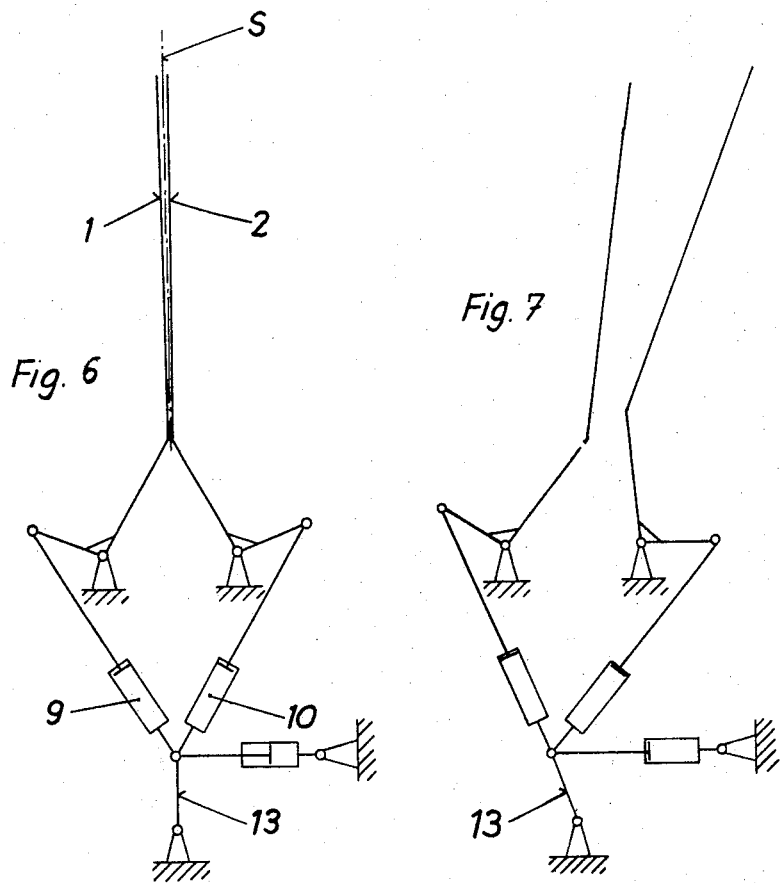

PLATE TURN-OVER MECHANISM

The invention relates to a plate turn-over mechanism with groups of turning arms pivotable about two parallel stationary shafts, which arms are provided in the vicinity of the pivot shafts with support lugs for supporting the plates during the turning process.

A plate-turn-over mechanism of this type having a crank drive is disclosed in German Patent Specification 1,158,026. The problem consists of replacing the mechanical crank drive by a hydraulic drive, which on account of the possibility of incorporating excess pressure valves offers the advantage that the mechanism is protected against over-loads in the drive, which could occur due to jamming during the turning operation.

An object of the invention is to construct the hydraulic drive in such a simple manner that no complicated control involving limit switches is required as might be regarded as necessary when one considers that for turning a plate the first group of turning arms, which has to receive the plate from the second group of turning arms, must tilt towards this second group by a tilting angle of more than 90° while the second group of turning arms lifting the plate from a roller bed up to this point needs only to have moved through a tilting angle of less than 90°. After that both groups of turning arms must be moved in synchronism through the vertical plane of symmetry of the mechanism in order that the plate resting on the support lugs of the second group is transferred to the support lugs of the first group of turning arms and is subsequently deposited on said first group of arms. This complicated sequence of movements of the turning arms during the turning operation is carried out according to the invention using hydraulic actuators in the simplest manner conceivable, without the movements of the turning arms having to be adjusted by independent actuation of the valves controlling each actuator.

According to the present invention, there is provided a plate turn-over mechanism comprising two groups of turning arms pivotal about two parallel stationary shafts, support lugs on said arms in the vicinity of the pivot shafts for supporting a plate during the turning process, and a double-acting hydraulic actuator for moving each group of arms, each actuator being mounted for pivotal movement about a common axis on a rocker arm pivotal through a vertical plane of symmetry between the two pivot shafts, such that when the pistons of the actuators are fully extended and the rocker arm is in the vertical mid-position, the two groups of turning arms lie face to face symmetrically with respect to the vertical plane of symmetry.

By means of the inter-position of the rocker arm between the actuators and the stationary pivotable support of the rocker arm, the rocker arm has a double function. The first function consists in that due to the tilting of the rocker arm into one or other of the inclined positions deivating from the vertical plane of symmetry the direction of plate transfer is determined since if the rocker arm is located in an inclined position the co-axial pivot point for the two actuators is moved out of the vertical plane of symmetry of the system and thus the different tilting angles of the two groups of turning arms for reaching the opposite inclined position, from which the co-axial tilting of the turning arms and the transfer of the plate from one group to another group of turning arms has to take place, are determined. The second function of the rocker arm consists of taking care of the stage of co-axial tilting of both groups of turning arms over the vertical plane of symmetry to the mirror image inclined position. For this the rocker arm is simply moved from one inclined position over its vertical mid-position into the other tilted position while maintaining the extreme position of the actuators previously controlled for the tilting of the turning arms in the opposite direction. If after this the actuators are reversed, due to the inclined position of the rocker arm of the assymetrical position of the co-axial pivot point of both actuators, provision is made for a full return stroke of the actuators so that one group of turning arms with the plate travels through the smaller tilting angle and the other group travels through the larger tilting angle of more than 90° as far as the initial position of the turning arms.

The turning arms in the initial horizontal position do not necessarily have to be supported by abutments since the initial position may be determined by the stroke limitation of the actuators. However, with this solution it should be noted that due to the stroke limitation of the actuators when the rocker arm is in a vertical position, a somewhat downwardly inclined position of the turning arms in the initial position is provided. Otherwise a group of turning arms would lift a plate when the rocker arm was swung into an inclined initial position. Thus the group of turning arms receiving a plate should not come into contact with the plate if the rocker arm is transferred to an inclined position.

Preferably, the turning arms are supported in a horizontal initial position but abutments and in this initial position of the turning arms the rocker arm may be swung from its vertical mid-position in both directions through the same tilting angle by means of actuators which are inoperative, i.e. switched to a floating position. In this solution the idle stroke for moving the rocker arm into the inclined position is within the complete stroke of the actuators. This has the advantage that the torque exerted by the turning arms does not have to be transmitted by the piston to the cylinder and its support, if the turning arms are in the initial position. The extent of the two inclined positions of the rocker arm determines, as aforesaid, the dissimilar characteristics of movement of the two groups of turning arms. The vertical mid-position of the rocker arm, which is mentioned solely for a better understanding of the kinematics in the drive of the turning arms, never needs to be provided in operation. Therefore a hydraulic tilting motor may be used for tilting the rocker arm, the stroke of which corresponds to the entire tilting angle of the rocker arm extending over the vertical mid-position so that no complicated control problems result even in the tilting drive for the rocker arm.

An embodiment of a plate turn-over mechanism according to the invention will now be described with reference to the drawings, in which:

FIGS. 4 to 8 are diagrammatic illustrations for clarifying a turn-over process.

Figure 1:
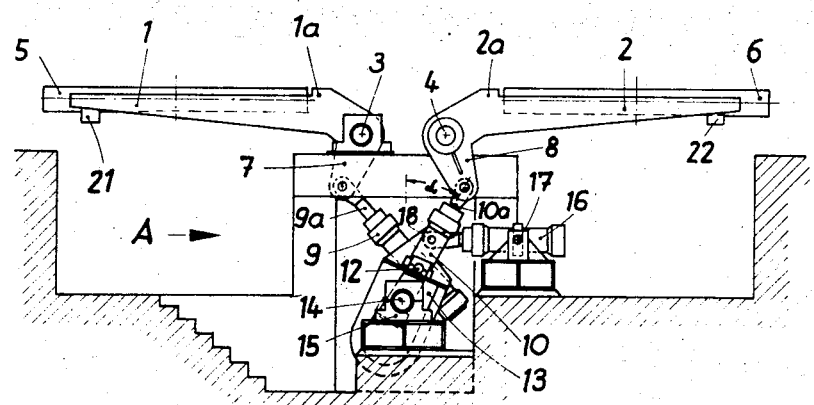
FIG. 1 shows the mechanism in cross-section through the pivot shafts of the turning arms in the horizontal initial position of the turning arms.

As illustrated, a plate turn-over mechanism comprises two groups of turning arms 1 and 2, which are respectively mounted to pivot on stationary parallel pivot shafts 3 and 4. Supports lugs 1a and 2a on the turning arms 1 and 2 serve for supporting the plates and preventing them from sliding during turning. The turning arms are staggered in groups on the pivot shafts 3 and 4 in order that the support lugs 1a and 2a may overlap in the region of the vertical plane or symmetry S for transferring the plate from one group of turning arms to the other group of turning arms.

One of the turning arms of each group fixed on the pivot shafts 3, 4 is constructed as an angle lever with a short lever arm 7 and 8, on which piston rods 9a and 10a of hydraulic actuators 9 and 10 are pivoted. The two hydraulic actuators 9 and 10 are coaxially pivotally mounted at 12 on a rocker arm 13 which is disposed in the vertical plane of symmetry S of the two pivot shafts 3,4 by means of pivot shafts 14 in bearing blocks 15. The rocker arm 13 consists of a welded structure which together with its bearings may be best seen from FIG. 3. The co-axial swivel mounting of the hydraulic actuators 9,10 is also best seen from FIG. 3.

With respect to its vertical mid-position, the rocker arm 13 may be pivoted in both directions by the same angle $\alpha$. A further hydraulic actuator 16 is used for this purpose and is mounted on gimbals at 17 and has a piston rod 16a which extends above the pivot shaft 14 of the rocker arm 13 for pivotal attachment to the rocker arm at 18. In FIG. 1, the piston rod 16a is in the fully retracted position, whereas in FIG. 2 it is fully extended. The stroke corresponds to the total swivel angle $2\alpha$ from the vertical mid-position of the rocker arm 13.

Figure 3:
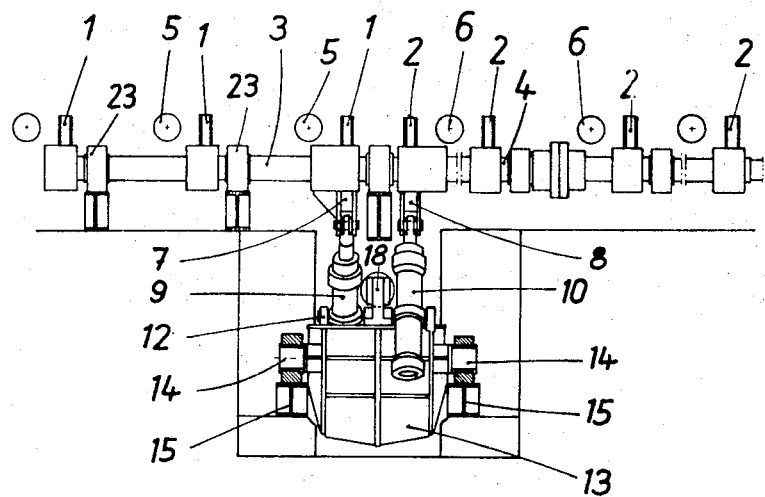
FIG. 3 is a view in the direction of arrow A in FIG. 1.

The mechanism receives plates from a roller bed 5 and turns them over onto a roller bed 6 or vice-versa. In the initial horizontal position illustrated in FIG. 1, the turning arms 1,2 are supported in the region of the roller beds by abutments 21 and 22. FIG. 3, which is a view in the direction of the arrow A in FIG. 1 shows the pivot shaft 3 with the turning arms 1 lying on the left-hand side in the fore-ground and the pivot shaft 4 with the turning arms 2 which are actually behind the shaft 3 with arms 1 are shown in the right-hand side for the sake of clarity. FIG. 3 also shows the bearings 23 for the pivot shaft 3 and the bearings 24 for the pivot shaft 4.

Before the method of operation of the mechanism is described with reference to the diagrams of FIGS. 4 to 8, it should be noted that FIG. 1 corresponds to FIG. 4 and FIG. 2 corresponds to FIG. 7. Firstly, reference is made to FIG. 6, which illustrates a symmetrical position of all the pivotable parts of the mechanism as occurs only transiently during the turning operation but is important to an understanding of the invention. It can be seen from this Figure that when the pistons of the actuators 9,10 are fully extended and when the rocker arm 13 is in its vertical mid-position, the two groups of turning arms 1, 2 lie face to face symmetrically with respect to the vertical plane of symmetry S. This configuration of the parts must be produced at this stage of the turning process if the desired simplifications as regards control are to be obtained.

Figure 4:
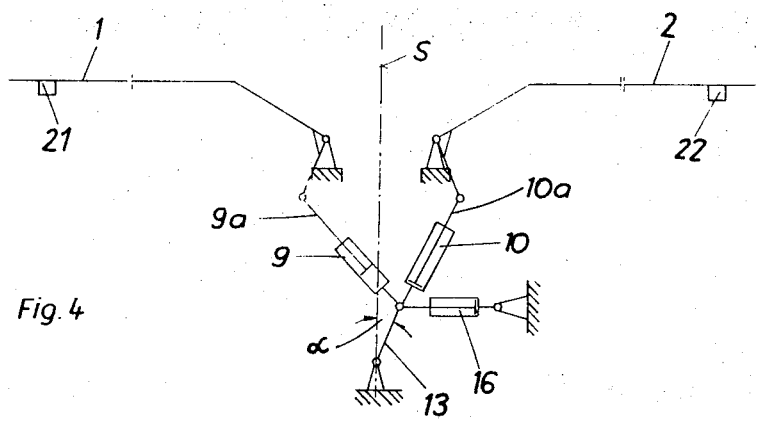
Figure 5:
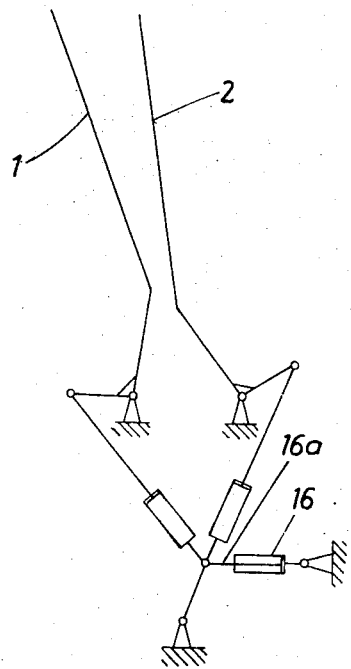

The method of operation of the mechanism is as follows:

In FIG. 4 and FIG. 1, the piston of the actuator 16 for the rocker arm 13 is retracted into the extreme right-hand position, so that the rocker arm 13 is swung through the angle $\alpha$. Since the hydraulic actuators 9,10 are now in the float condition i.e. the actuators are inoperative, the turning arms 1,2 remain supported on their abutments 21, 22 since the frictional resistance inside the actuators 9,10 is less than the torque exerted by the weight of the turning arms 1, 2. When the rocker arm 13 is inclined to the right according to FIG. 4, it is intended to lift a plate lying on the roller bed 5 by the group of turning arms 1. In the reverse case, when the piston of the actuator 16 is extended the rocker arm 13 is inclined towards the left, the actuators 9, 10 again being in the float condition.

It can be seen from FIG. 4 and from FIG. 1 that at this stage the piston rod 9a of the actuator 9 is extended further than the piston rod 10a of the actuator 10, even though the initial horizontal position of the turning arms 1, 2 is the same. When the rocker arm 13 is swung from its vertical mid-position into a sloping position, both actuators, 9,10 accordingly carry out oppositely directed idle strokes, because, for example, when swinging the rocker arm 13 in clockwise direction into the position according to FIG. 4, the co-axial attachment point 12 of both actuators to the rocker arm shifts towards the right and the piston of the actuator 10 must thus be able to carry out an inactive idle stroke as far as the terminal position according to FIG. 4. For the same reason, the piston rod 9a of the actuator 9 extends somewhat in the idle stroke.

Due to the swinging of the rocker arm 13 into an inclined position, the actuators 9, 10 accordingly come into a position, in which they must carry out different strokes for fully extending their piston rods 9a, 10a. Thus, if the actuators 9,10 are operated to extend their piston rods, the turning arms 1 together with the plate are only able to reach the sloping position according to FIG. 5, whereas the turning arms 2, to which the full stroke of the actuator 10 is available, can be adjusted beyond the 90° position to face the turning arms 1. In order to reach the position according to FIG. 5 from the position according to FIG. 4, control valves for the actuators 9 and 10 are brought out of the piston float position so that the piston rods 9a, 10a extend fully.

Figure 2:
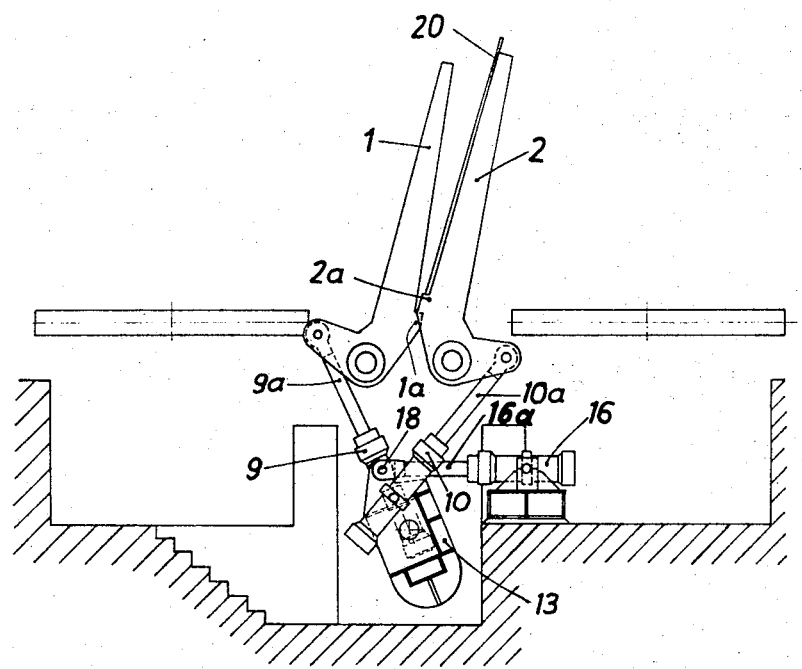
FIG. 2 shows the mechanism illustrated in FIG. 1 shortly before the transfer or shortly after the transfer of a plate from one group of turning arms to the other.

The transfer stage of the sheet 20 (FIG. 2) from the first group of turning arms 1 to the second group of turning arms 2 now begins, for which the two groups of turning arms must be swung in the same direction in known manner over the vertical plane of symmetry S into the position according to FIG. 7 or FIG. 2. This is achieved in a simple manner by fully extending the piston rod 16a of the actuator 16, thus passing through the afore-described configuration according to FIG. 6 and after reaching the oppositely inclined position of the rocker arm 13 according to FIG. 7, the transfer of the sheet by the group of turning arms 2 is completed. During this process the actuators 9 and 10 remain fully under load.

Figure 8:
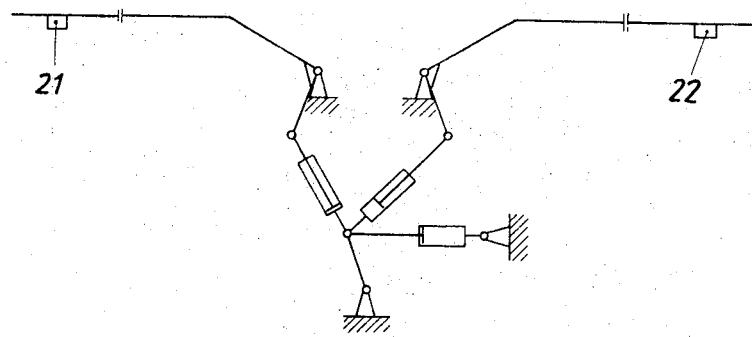

Now, if the double-acting actuators 9,10 are operated to retract their pistons both groups of turning arms carry out their unequal swinging movements as far as their initial horizontal position determined by the abutments 21,22 as illustrated in FIG. 8.

From the position of FIG. 8, the plate could readily be swung back again by the turning arms 2. However, if the next plate is to be picked up from the roller bed 5 (FIG. 1), then, with the actuators 9, 10, set into the float condition, the actuator 16 has to be reversed again in order that the rocker arm 13 again assumes the inclined position according to FIG. 4.

It will be appreciated that the piston of a double-acting hydraulic actuator can readily be set into the float condition by use of known control techniques by which the two pressure chambers of the actuator are short-circuited.

What is claimed is:

1. Plate turn-over mechanism comprising two groups of turning arms pivotal about two parallel stationary shafts, support lugs on said arms in the vicinity of the pivot shafts for supporting a plate during the turning process, and a double-acting hydraulic actuator for moving each group of arms, each actuator being mounted for pivotal movement about a common axis on a rocker arm pivotal through a vertical plane of symmetry between the two pivot shafts, such that when the pistons of the actuators are fully extended and the rocker arm is in the vertical mid-position, the two groups of turning arms lie face to face symmetrically with respect to the vertical plane of symmetry.

2. A mechanism according to claim 1, wherein the turning arms in their initial horizontal position are supported by abutments and in this initial position of the turning arms the rocker arm is pivoted from its vertical mid-position in both directions through the same angle by the actuators switched to an inoperative i.e. to a floating position.

3. A mechanism according to claim 2, wherein a hydraulic actuator serves for swinging the rocker arm, the stroke of said actuator corresponding to the total swivel angle of the rocker arm the vertical mid-position.

* * * * *